US012460966B2

(12) United States Patent
Knünz et al.

(10) Patent No.: US 12,460,966 B2
(45) Date of Patent: Nov. 4, 2025

(54) APPARATUS FOR A MOTOR VEHICLE, AND MOTOR VEHICLE

(71) Applicant: Continental Automotive Technologies GmbH, Hannover (DE)

(72) Inventors: Sebastian Knünz, Munich (DE); Gianfranco Visano, Seligenstadt (DE)

(73) Assignee: Continental Automotive Technologies GmbH, Hannover (DE)

( * ) Notice: Subject to any disclaimer, the term of this patent is extended or adjusted under 35 U.S.C. 154(b) by 185 days.

(21) Appl. No.: 17/923,032

(22) PCT Filed: May 4, 2021

(86) PCT No.: PCT/DE2021/200056
§ 371 (c)(1),
(2) Date: Nov. 3, 2022

(87) PCT Pub. No.: WO2021/223821
PCT Pub. Date: Nov. 11, 2021

(65) Prior Publication Data
US 2023/0173918 A1 Jun. 8, 2023

(30) Foreign Application Priority Data
May 6, 2020 (DE) ...................... 10 2020 112 221.7

(51) Int. Cl.
*G01J 1/04* (2006.01)
*B60K 35/10* (2024.01)
(Continued)

(52) U.S. Cl.
CPC ............ *G01J 1/0407* (2013.01); *B60K 35/22* (2024.01); *B60K 35/60* (2024.01); *B60K 37/20* (2024.01); *B60K 35/10* (2024.01)

(58) Field of Classification Search
CPC .. B60K 35/00; B60K 35/22; B60K 2360/785; B60K 2360/96; B60K 35/60;
(Continued)

(56) References Cited

U.S. PATENT DOCUMENTS 9,091,572 B2 * 7/2015 Rawer ................... B60K 35/00
2012/0170284 A1 * 7/2012 Shedletsky ........... G01J 1/0407
362/355
(Continued)

FOREIGN PATENT DOCUMENTS

DE 102014005976 A1 9/2014
DE 4146491 B1 * 1/2025 ............. B60K 35/60
(Continued)

OTHER PUBLICATIONS

Search Report dated Feb. 20, 2021 from corresponding German patent application No. 10 2020 112 221.7.
(Continued)

*Primary Examiner* — David P Porta
*Assistant Examiner* — Gisselle M Gutierrez
(74) *Attorney, Agent, or Firm* — COZEN O'CONNOR

(57) ABSTRACT

A motor vehicle comprising a translucent front panel, an infrared component configured to receive and/or transmit radiation in the infrared range, a coating arranged on a main surface of the front panel, wherein the infrared component is arranged on the main surface of the front panel in a component region, the coating is arranged between the front panel and the infrared component and is arranged both in the component region and outside the component region, and the coating is transmissive to radiation in the infrared range and has a predefined color locus is disclosed. A motor vehicle comprising an apparatus is also disclosed.

10 Claims, 1 Drawing Sheet

(51) Int. Cl.
*B60K 35/22* (2024.01)
*B60K 35/60* (2024.01)
*B60K 37/20* (2024.01)

(58) Field of Classification Search
CPC .......... B60K 2360/48; B60K 2360/682; G01J 1/0407; B60J 1/02
See application file for complete search history.

(56) References Cited

U.S. PATENT DOCUMENTS

| | | | |
|---|---|---|---|
| 2013/0048837 A1* | 2/2013 | Pope | G01J 1/0407 |
| | | | 250/214.1 |
| 2014/0085245 A1* | 3/2014 | Baldwin | G01J 1/4228 |
| | | | 250/341.7 |
| 2014/0185129 A1 | 7/2014 | Kim et al. | |
| 2015/0103272 A1 | 4/2015 | Kokusho | |
| 2016/0054175 A1* | 2/2016 | Jia | G01J 1/0233 |
| | | | 250/216 |
| 2019/0001629 A1* | 1/2019 | Laluet | B32B 17/10036 |
| 2019/0138115 A1 | 5/2019 | Thomas, III et al. | |
| 2019/0280058 A1 | 9/2019 | Li | |
| 2019/0291388 A1 | 9/2019 | Bauerle | |
| 2020/0288070 A1* | 9/2020 | Siala | G01S 17/89 |
| 2020/0369007 A1* | 11/2020 | Bauerle | B32B 37/12 |
| 2023/0214085 A1* | 7/2023 | Fish, Jr. | G06F 21/32 |
| | | | 715/810 |
| 2023/0244016 A1* | 8/2023 | Anzai | G02B 5/3016 |

FOREIGN PATENT DOCUMENTS

| | | | | |
|---|---|---|---|---|
| FR | 3077219 A1 | | 8/2019 | |
| JP | 2004196184 A | * | 12/2005 | ....... B32B 17/10036 |
| WO | 2017203133 A1 | | 11/2017 | |

OTHER PUBLICATIONS

International Search Report and Written Opinion dated Oct. 28, 2021 from corresponding International patent application No. PCT/DE2021/200056.

* cited by examiner

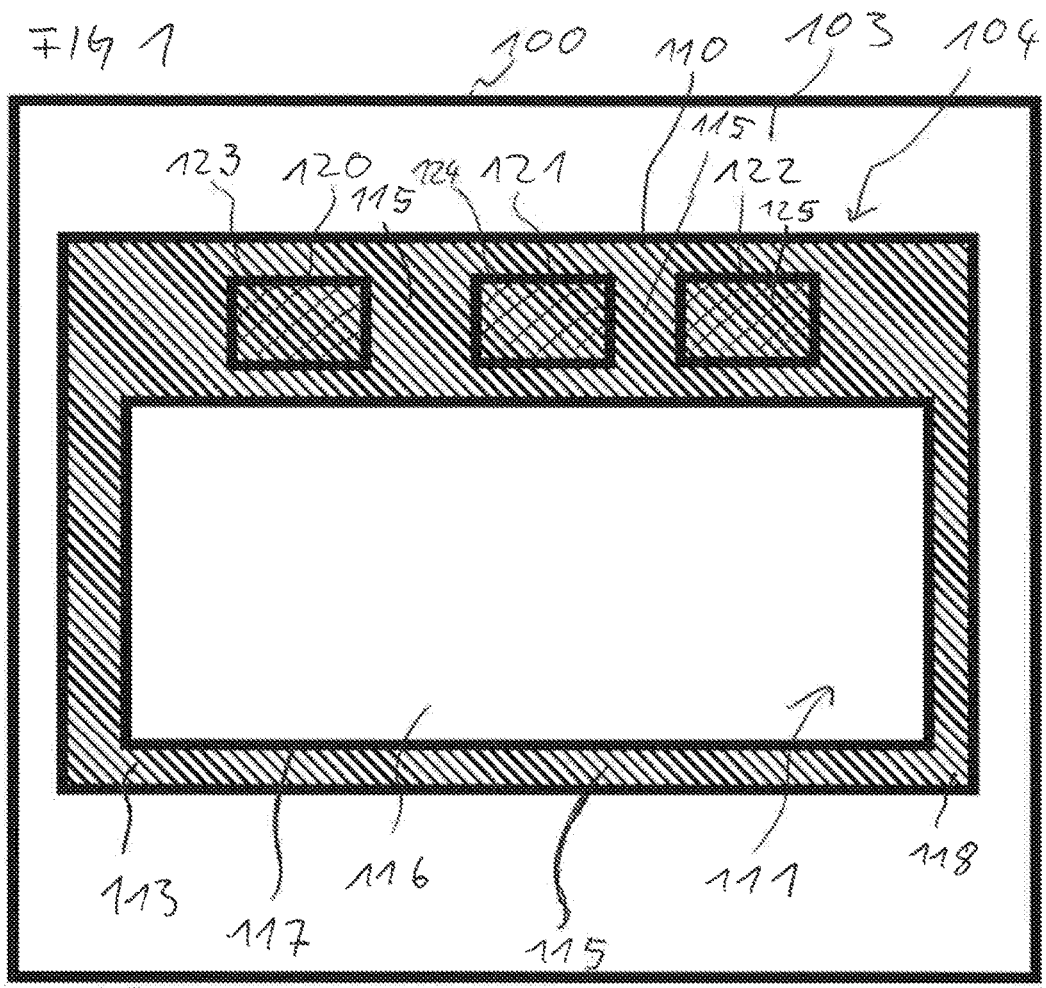
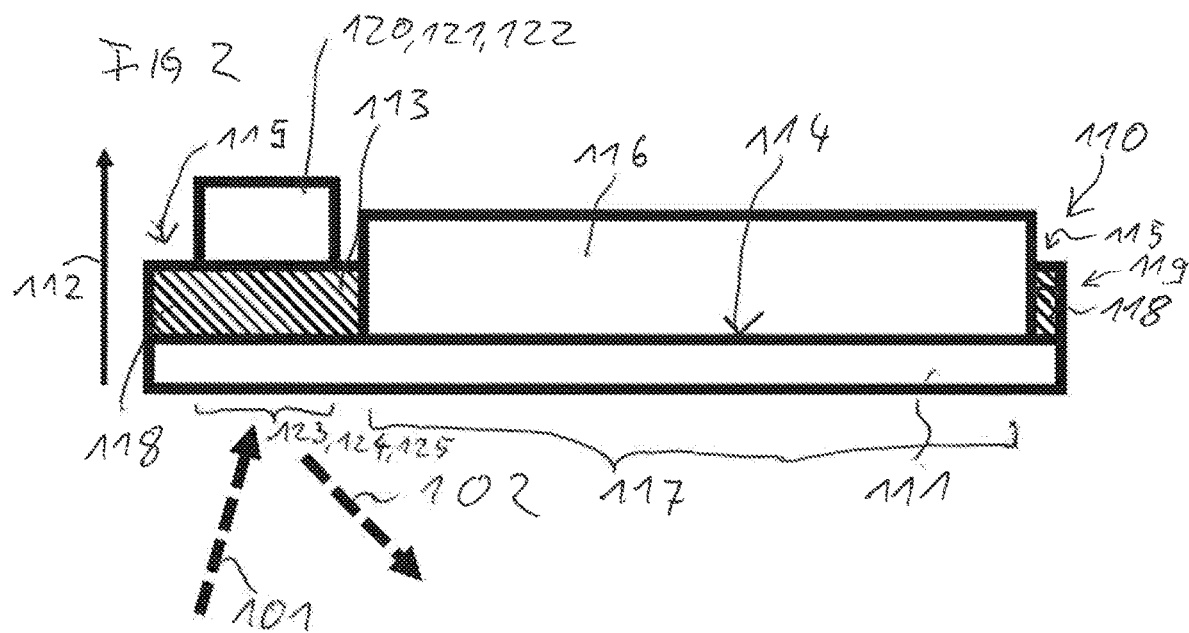

APPARATUS FOR A MOTOR VEHICLE, AND MOTOR VEHICLE

CROSS REFERENCE TO RELATED APPLICATIONS

This U.S. patent application claims the benefit of PCT patent application No. PCT/DE2021/200056, filed May 4, 2021, which claims the benefit of German patent application No. 10 2020 112 221.7, filed May 6, 2020, both of which are hereby incorporated by reference.

TECHNICAL FIELD

The disclosure relates to an apparatus for a motor vehicle, in particular comprising a display apparatus, and to a motor vehicle comprising such an apparatus.

BACKGROUND

In motor vehicles, optical transmitters and receivers are used to capture for example information from the interior of the motor vehicle.

It is desirable to specify an apparatus for a motor vehicle which has good optical properties and/or a good optical appearance. It is additionally desirable to specify a motor vehicle which comprises an apparatus having good optical properties and/or having a good optical appearance.

SUMMARY

In accordance with at least one embodiment, an apparatus for a motor vehicle comprises a translucent front panel. The front panel is translucent and/or transparent for example to radiation in the infrared range. The infrared radiation has for example a wavelength of between 780 nm and 1 mm. The apparatus comprises an infrared component. The infrared component is configured to receive and/or transmit radiation in the infrared range. The infrared component may also be referred to as an optoelectronic component and comprises for example one optoelectronic semiconductor chip or a plurality of optoelectronic semiconductor chips.

The apparatus comprises a coating. The coating is arranged on a main surface of the front panel. In particular, the coating is connected to the front panel. The infrared component is arranged on the main surface of the front panel in a component region. The coating is arranged between the front panel and the infrared component. The coating is arranged both in the component region and outside the component region. The coating is transmissive to radiation in the infrared range. The coating is in particular translucent and/or transparent to radiation in the infrared range. The coating has a predefined color locus.

The arrangement of the coating both in the region in which the infrared component is arranged and outside the region enables good optical properties of the apparatus. The coated front panel has a uniform appearance to an external observer. The component region and regions outside the component region appear identical. For example, there is no discernible difference in color locus between the component region and regions outside the component region. Moreover, there is a reliable transmissivity of the radiation in the infrared range. The coating and in particular materials of the coating are selected such that radiation which is transmitted and/or received by the infrared component during operation passes through the front panel and through the coating, without being significantly absorbed, reflected or otherwise undesirably attenuated. The color locus of the coating is predefined so as to realize a desired color locus for the external observer. For example, the materials of the coating are selected accordingly. By way of example, the color locus is selected depending on further elements, for example elements arranged in direct proximity to the apparatus in the motor vehicle in the state ready for operation.

In accordance with at least one embodiment, the apparatus comprises a display apparatus. The display apparatus is configured for displaying visual information. The display apparatus comprises for example a screen, also called display. The display apparatus is arranged on the main surface of the front panel in a display region. The coating at least partly surrounds the display region. The component region is arranged in particular next to the display region. Consequently, both the display region and the component region are formed next to one another on the front panel. The coating is arranged next to the display apparatus. For example, no coating is provided in the display region. The coating is provided for example next to the display region on individual sides or a plurality of sides. In accordance with embodiments, the coating completely surrounds the display region in a frame-like manner. The display region is bounded by the frame. The infrared component and the display apparatus are arranged next to one another on the front panel.

In accordance with further embodiments, no display apparatus is provided. Instead, for example, other components are arranged on the front panel in addition to the infrared component. It is also possible for only the infrared component and no further components to be provided on the front panel. In accordance with embodiments, the coating is arranged over the whole surface or only partly on the main surface. The coating surrounds at least the component region and bounds in particular the component region, such that the coating is both provided on the infrared component and directly adjacent to the infrared component.

In accordance with at least one embodiment, the display apparatus has a further color locus in a switched-off state, for example in a de-energized state. The predefined color locus is predefined such that the predefined color locus and the further color locus are identical within predefined tolerances. The predefined color locus is predefined depending on the further color locus. By way of example, the deviation between the two color loci is less than 2%, less than 1% or less than 0.5%. Other predefined tolerances are also possible. In particular, the predefined color locus and the further color locus are coordinated with one another such that no differences between the color loci are discernible to an external observer during normal operation. The external observer is in particular a human being and the color loci have the same effect on the human eye.

By way of example, the display apparatus appears black in the switched-off state. The predefined color locus for the coating is correspondingly predefined as appearing black. Consequently, when the display apparatus is switched off, there is for example no discernible difference between the display region, the component region and further regions outside the display region and the component region. By way of example, in the switched-off state, the display apparatus appears in a different color than black, for example bluish. The predefined color locus for the coating is predefined in a manner corresponding to the different color, i.e. appearing bluish, for example. A coordination of the predefined color locus depending on other elements is also possible, for example depending on elements outside the apparatus. By way of example, the color locus is predefined depending on elements arranged directly adjacent to the apparatus in the installed state of the apparatus. If the adjacent element is red, for example, the color locus for the coating is correspondingly predefined as appearing red.

In accordance with at least one embodiment, the coating is configured as an imprint. Alternatively or additionally, the coating is configured as a foil. Alternatively or additionally, the coating is configured as a film. Combinations are likewise possible. By way of example, the coating comprises a plurality of partial layers. The partial layers each have mutually different optical properties, for example. Consequently, both the desired predefined color locus is able to be realized and the transmissivity to the radiation in the infrared range is able to be realized.

In accordance with at least one embodiment, the apparatus comprises a plurality of infrared components. The infrared components are each arranged in an assigned component region. The component regions are spaced apart from one another. By way of example, the apparatus comprises an infrared transmitter. An infrared receiver is embodied separately therefrom. It is also possible for a plurality of infrared transmitters to be provided. By way of example, a camera that is sensitive in the infrared range is provided.

In accordance with at least one embodiment, a frame region is provided between the component regions. The coating is configured in an identical fashion in the component regions and in the frame regions. Consequently, in the case of a multiplicity of infrared components, too, a uniform appearance is able to be realized and at the same time a sufficient transmissivity to infrared radiation is ensured for the individual components.

The apparatus thus makes it possible in particular to link the display apparatus and one infrared component or a plurality of infrared components to a common front panel. The coating makes it possible to arrange the components without the latter being immediately discernible to the human eye. The components transmit and receive their radiation through the coating and the front panel during operation. The components are for example distance sensors, infrared light sources, cameras or further components that serve to determine information about the interior of a motor vehicle, operating states or properties of a user of the vehicle. The coating enables a uniform appearance since the coating has uniform optical properties, both in the component region and outside the component region. Consequently, different optical properties between the component region and some other coating for surrounding the display apparatus are avoided.

The coating having the predefined color locus appears in particular as black as possible to the human eye and is coordinated as well as possible with the color locus of the switched-off display apparatus. Consequently, jointly arranging the display apparatus and the infrared components on the front panel is possible and at the same time hiding the infrared components toward the outside is able to be realized, the functionality of the infrared components not being influenced, or not being significantly influenced.

By way of example, the entire main surface of the front panel with the exception of the display region is covered with the coating. By way of example, no further additional coating composed of other materials is provided or necessary.

In accordance with at least one embodiment, a motor vehicle comprises an apparatus in accordance with at least one embodiment described here. The apparatus is arranged in an interior of the motor vehicle and is for example part of an information system of the motor vehicle.

BRIEF DESCRIPTION OF THE FIGURES

Further advantages, features and developments will become apparent from the following embodiments explained in association with the Figures.

Identical elements, elements of the same type and elements with equivalent actions may be provided with the same reference signs throughout the Figures.

In the Figures:

FIG. 1 shows a schematic illustration of a vehicle comprising an apparatus in accordance with one embodiment; and FIG. 2 shows a schematic cross-sectional view of an apparatus in accordance with one embodiment.

FIG. 1 schematically shows a motor vehicle 100, for example an automobile. The motor vehicle 100 comprises an interior 103. An apparatus 110 is arranged in the interior 103. The apparatus 110 is arranged for example in a front region of the motor vehicle 100. The apparatus 110 is for example part of an information system 104 of the motor vehicle. The apparatus 110 serves for example for presenting visual information to a user of the motor vehicle 100. Moreover, the apparatus 110 serves for example to determine information about the interior 103. Alternatively or additionally, information about a user of the motor vehicle 100 is intended to be determined.

The apparatus 110 comprises a translucent front panel 111. The front panel 111 is transmissive for example to radiation in the visible range. In addition, the front panel 111 is transmissive to radiation in the infrared range. The front panel 111 is formed from a glass or a plastic, for example. The front panel 111 adjoins the interior 103 by way of an outer side, for example. A user looks at the outer side of the front panel 111 during operation. The front panel 111 comprises a main surface 114 opposite the outer side, as is also evident from FIG. 2. The main surface 114 faces away from the interior 103 in the state ready for operation. The front panel has a larger extent along the main surface 114 than transversely thereto.

A display apparatus 116 for displaying visual information is arranged on the main surface 114 in a display region 117. The display apparatus 116 is for example an LCD display, an OLED display, or comprises some other type of display.

A coating 113 is provided on the main surface 114 outside the display region 117. The coating is arranged in particular directly on the main surface 114. The coating 113 is transmissive to incoming radiation 101 in the infrared range and outgoing radiation 102 in the infrared range. The coating 113 is for example not transmissive to radiation in the visible range. The coating 113 appears for example black to the human eye. The coating 113 appears for example colored to the human eye like the color of the display apparatus 116 in the switched-off state. When looking at the front panel 111 from the interior 103, for the human observer there is for example no discernible difference between the display apparatus 116 and the coating 113 when the display apparatus 116 is switched off. The coating 113 surrounds the display region 117 for example completely and thus forms a frame 118.

An infrared component 120 is arranged on a side of the coating 113 facing away from the front panel 111. In the embodiment illustrated, three infrared components 120, 121, 122 are arranged next to one another. More or fewer infrared components are also possible. The infrared components are for example infrared transmitters, infrared receivers or a combination thereof. The infrared component 120 is arranged in an assigned component region 123. The infrared component 121 is arranged in an assigned component region 124. The infrared component 122 is arranged in a component region 125. Consequently, in the embodiment illustrated, each of the infrared components 120, 121, 122 is provided in a dedicated component region 123, 124, 125. The individual component regions 123, 124, 125 are arranged at a distance from one another. A frame region 115 is in each case arranged between the component regions 123, 124, 125. The coating 113 is formed in the frame region, but no infrared component 120, 121, 122 is arranged therein. Through the frame region 115, during operation, actively in particular no radiation 102 is emitted nor is incoming radiation 101 received and evaluated. It is also possible for a plurality of infrared components to be arranged in a common component region.

In the component regions 123, 124, 125, therefore, firstly the front panel 111 is arranged along a stacking direction 112. The coating 113 is subsequently provided on the main surface 114. An infrared component 120, 121, 122 is subsequently provided. The stacking direction 112 runs perpendicularly to the main surface 114 in FIG. 2.

The coating 113 is provided in an identical fashion both in the component regions 123, 124, 125 and outside the component regions for example in the frame regions 115. The frame 118 is formed from the coating 113 in particular at all points. The display apparatus 116 is completely surrounded by the coating 113 in a frame-like manner. The frame 118 surrounds the display apparatus 116 and forms the component regions 123, 124, 125. The frame is transmissive to radiation in the infrared range outside the component regions 123, 124, 125 as well.

A color locus of the frame 118 composed of the coating 113 is predefined such that the color locus corresponds to a further color locus as much as possible. The further color locus is the color locus of the display apparatus 116 in the switched-off state. Consequently, when the display apparatus is switched off, to the external observer from the interior 103 there is as far as possible no discernible difference between the display region 117, the frame region 115 and the component regions 123, 124, 125. The component regions 123, 124, 125 and also the frame regions 115 and the display region 117 appear black in an identical fashion. For example, the frame regions 115 and the component regions 123, 124, 125 appear black in an identical fashion since they are formed by one and the same coating 113.

The coating 113 is printed onto the main surface 114, for example. Alternatively, or additionally, the coating 113 is applied, for example adhesively bonded, onto the main surface 114 as a prefabricated foil. It is also possible to form the coating 113 as a film on the main surface 114.

By way of example, the coating 113 is applied as a single layer. In accordance with further exemplary embodiments, the coating 113 comprises for example a plurality 119 of partial layers stacked one on top of another along the stacking direction 112. By way of example, the partial layers have mutually different optical properties. This makes it possible for example both to set the predefined color locus as desired, for example black, and to realize the desired transmissivity to the infrared radiation.

By way of example, the coating 113 is formed from one polymer or comprises a mixture of different polymers. By way of example, the coating 113 comprises polymer-based birefringent layers. Other materials and optical properties of the coating 113 and of the plurality 119 of partial layers are also possible.

The apparatus 110 makes it possible to arrange the infrared components 120, 121, 122 and the display apparatus 116 on the common front panel 111. By way of example, distance sensors and/or a camera system and a display are thus combinable. The coating 113, the color of which is coordinated with the display apparatus in the switched-off state, enables good optical properties both with regard to the infrared transmissivity and with regard to the uniform appearance of the apparatus 110 to the user in the state ready for operation.

The invention claimed is:

1. An apparatus for a motor vehicle, comprising:
a translucent front panel;
an infrared component configured to receive and/or transmit radiation in the infrared range; and
a coating arranged on a main surface of the front panel,
wherein
the infrared component is arranged on the main surface of the front panel in a component region, wherein the coating is arranged between the front panel and the infrared component and is arranged both in the component region and outside the component region, and wherein the coating is transmissive to radiation in the infrared range and has a predefined color locus.

2. The apparatus as claimed in claim 1, comprising a display apparatus for displaying visual information, wherein the display apparatus is arranged on the main surface of the front panel in a display region, wherein the coating at least partly surrounds the display region.

3. The apparatus as claimed in claim 2, wherein the coating completely surrounds the display region in a frame-like manner.

4. The apparatus as claimed in claim 2, wherein the display apparatus has a further color locus in a switched-off state, wherein the predefined color locus is predefined such that the predefined color locus and the further color locus are identical within predefined tolerances.

5. The apparatus as claimed in claim 1, wherein the coating is embodied as an imprint, a foil and/or a film.

6. The apparatus as claimed in claim 1, wherein the coating is constructed from a plurality of partial layers, wherein the partial layers each have mutually different optical properties.

7. The apparatus as claimed in claim 1, wherein the predefined color locus is predefined such that the predefined color locus is black to an external observer within predefined tolerances.

8. The apparatus as claimed in claim 1, comprising a plurality of infrared components arranged in respectively assigned component regions, wherein the component regions are spaced apart from one another.

9. The apparatus as claimed in claim 8, wherein a frame region is provided between the component regions, wherein the coating is embodied in an identical fashion in the component regions and in the frame regions.

10. A motor vehicle, comprising an apparatus comprising:
a translucent front panel;
an infrared component configured to receive and/or transmit radiation in the infrared range; and
a coating arranged on a main surface of the front panel,
wherein the infrared component is arranged on the main surface of the front panel in a component region, wherein the coating is arranged between the front panel and the infrared component and is arranged both in the component region and outside the component region, wherein the coating is transmissive to radiation in the infrared range and has a predefined color locus, and wherein the apparatus is arranged in an interior of the motor vehicle and is part of an information system of the motor vehicle.

\* \* \* \* \*